United States Patent [19]

Lipscomb

[11] Patent Number: 5,038,382
[45] Date of Patent: Aug. 6, 1991

[54] MULTI-SCALE RECOGNIZER FOR HAND DRAWN STROKES

[75] Inventor: James S. Lipscomb, Yorktown Heights, N.Y.

[73] Assignee: International Business Machines Corporation, Armonk, N.Y.

[21] Appl. No.: 421,211

[22] Filed: Oct. 13, 1989

[51] Int. Cl.$^5$ .............................................. G06K 9/62
[52] U.S. Cl. .......................................... 382/13; 382/56
[58] Field of Search ............................ 382/13, 21, 56

[56] References Cited

U.S. PATENT DOCUMENTS

| | | | |
|---|---|---|---|
| 4,608,658 | 8/1986 | Ward | 382/13 |
| 4,628,532 | 12/1986 | Stone et al. | 382/21 |
| 4,718,103 | 1/1988 | Shojima et al. | 382/13 |

Primary Examiner—Leo H. Boudreau
Assistant Examiner—David Fox
Attorney, Agent, or Firm—Jack M. Arnold

[57] ABSTRACT

A known hand drawn stroke is serially sampled at different scales by n angle filters to provide n filtered known strokes at n different scales. An unknown hand drawn stroke is sampled in a like manner to provide n filtered unknown strokes at n different scales. Filtered unknown strokes are compared with filtered known strokes. If there is a comparison within predetermined limits at any scale, the unknown hand drawn stroke is recognized as being the same as the known hand drawn stroke.

14 Claims, 16 Drawing Sheets

FIG. 1

FIG. 5
FIG. 6

FIG. 19D
$\ell_1 = 3$
$\ell_2 = 1$
$\ell_3 = 2$
$\ell_4 = 3$
$g = 2$

FIG. 20   $S = 1$

FIG. 21   ORIENTATIONS=1
REFLECTION="NO"

MULTI-SCALE RECOGNIZER FOR HAND DRAWN STROKES

The invention is in the field of signal processing, and in particular is directed to handwriting recognition. Specifically, the invention is directed to a multi-scale recognizer for hand drawn strokes.

CROSS REFERENCE TO RELATED APPLICATIONS

Reference is made to U.S. patent application Ser. No. 07/416,564, filed on 10/03/89, which is entitled "Cross-Product Filter", which application is assigned to the assignee of this patent application, and which describes a mechanism for providing a filtered stroke to the input of the Multi-Scale Recognizer of this application.

BACKGROUND OF THE INVENTION

In many signal processing applications a digitizing tablet is used to convert pen or stylus motion into a set of electrical data which is then processed by digital equipment. Typically, there is a special electronic or electromagnetic grid or surface which detects the X and Y positions of the pen as it moves along the surface at a periodic rate. The information is present as two digital data words at a periodic clock rate. This class of technology is used for signature verifications, automatic drafting, graphics, character recognition, handwriting recognition and so forth. In each case, the user writes on the writing surface with the writing instrument and the position is monitored electronically.

In connecting such a device directly to a processing system there are problems because the raw data may contain certain kinds of noise or other defects which can adversely effect applications that process the data for editing, character recognition, graphics and other uses. The noise may be electrical or mechanical noise produces by the equipment employed to generate the sequence of signals corresponding to the stroke of the writing instrument. The noise may also be nature noise produced by the writer retracing a portion of the stroke at either end.

An angle filter used in stroke recognition produces output at a given angle. There are a number of patents dealing with this technological area, each having certain advantages and disadvantages.

In U.S. Pat. No. 4,718,103 to Shojima et al. a method and apparatus are described for on-line recognizing handwritten patterns. A handwritten pattern approximated to a series of polygonal lines consisting of segments is compared with a candidate pattern selected from dictionary patterns stored in the memory, basing on the angular variation between angular variations of adjoining segments of both patterns is outside of a certain range, it is tested whether the difference between an angular variation across three or more consecutive segments and the above reference angular variation is within the range.

In U.S. Pat. No. 4,653,107 to Shojima et al. coordinates of a handwritten pattern drawn on a tablet are sequentially sampled by a pattern recognition unit to prepare pattern coordinate data. Based on an area encircled by segments created by the sampled pattern coordinate data of one stroke and a line connecting a start point and an end point of the one-stroke coordinate data, the sampled pattern coordinate data of the one stroke is converted to a straight line and/or curved line segments. The converted segments are quantized and normalized. The segments of the normalized input pattern are rearranged so that the input pattern is drawn in a predetermined sequence. Differences between direction angles for the rearranged segments are calculated. Those differences are compared with differences of the direction angles of the dictionary patterns read from a memory to calculate a difference therebetween. The matching of the input pattern and the dictionary pattern is determined in accordance with the difference. If the matching fails, the first or last inputted segment of the input pattern is deleted or the sampled pattern coordinate data of the next stroke is added, to continue the recognition process.

In U.S. Pat. No. 4,731,857 to Tappert a method of processing a word is set forth, with the segmentation and recognition steps combined into an overall scheme. This is accomplished by a three step procedure. First, potential or trail segmentation points are derived. This is done in a manner so as to ensure that essentially all true segmentation points are present but also includes extra or not true segmentation points. Second, all combinations of the segments that could reasonably be a character are sent to a character recognizer to obtain ranked choices and corresponding scores. Finally, the recognition results are sorted and combined so that the character sequences having the best cumulative scores are obtained as the best word choices. For a particular word choice there is a corresponding character segmentation, simply the segment combinations that resulted in the chosen characters. With this recognition scheme the initial character segmentation is not final and need not be highly accurate, but is subject to a lesser constraint of containing the true segmentation points.

In Japanese Patent 57-159385 to Gijutsuin et al. sets forth a pattern reading system to enable highly accurate correlation, to cope with irregular local variation of handwritten letters etc. and to read complicated letter patterns by correlating characteristics extracted from an input pattern successively form general to details. The directional property of a line is extracted by a preparation section A from an object input pattern is accordance with information of a point and points around it. Using the extracted directional property pattern, higher order characteristics by directional projection of large area and lower order characteristics by directional projection of smaller area are extracted by a characteristic extraction section B. Further, matching between input pattern and mask for conception to be classified is made by a matching section C. The degree of matching is measured by correlation of higher order characteristics using the higher order characteristics provided beforehand and input pattern. Then, characteristic point is shifted in accordance with the result of correlation in higher order, and correlation and valuation of lower order characteristics are made. Thus, irregular letter patterns are read correctly.

In Japanese Patent 60-59486 to Kogyko et al a handwritten character is recognized by selecting a segment having a lower degree of difference among the segments of the other (one) side for either one of an input and a standard pattern as the 1st (2nd) segment correspondence group and obtaining the degree of the difference among the groups which share 1 or more segments within both groups. A standard pattern S approximated by a broken line and an input pattern S' are normalized according to the size and positions of centroids and superposed to obtain the degree of the difference of the segments between both patterns. The segment having the lower degree of the difference is obtained, and plural groups are formed in paired forms, i.e., the 1st group $l_1:l_1'$ and the 2nd group $l_2, l_3:l_2', l_3', l_4'$ respectively. Then $l_4:l_5', l_6'$ is finally obtained. The degree of difference is detected for each group. Then the sum total of these degrees of difference is defined as the degree of difference between both patterns. This method is applied also to other standard patterns to decide an input pattern approximating a standard pattern. Thus the characters are recognized.

In U.S. Pat. No. 4,608,658 to J. Ward a method and apparatus are described for processing a series of digital signals representing a stroke of a stylus on a tablet to remove signals at the ends of the stroke caused by retracing, the series of signals corresponding to the X and Y coordinates of a series of points along the direction of travel of the stroke. The signals for each point in the series are compared to the signals of the points adjacent to it to form a second series of signals which contain only those signals corresponding to points having an ordinate value of its adjacent points. The first three points in the second series of signals are then processed to determine the ration of the distance from the first point to the second point to the distance from the second point to the third point and to determine the size of the angle formed by the three points. The distance ration is fed into a table-look-up which outputs a reference angle signal which is compared to the processed angle signal. If the processed angle signal is less than the reference angle, the second point in the second series is used as the end point and all points in the first series before that point are discarded as being caused by retracing. In the processed angle is equal to or greater than the reference angle. The first point in the second series is used as the end point. The last three points in the second series are processed in a similar manner to determine the correct end point. The last three points in the second series are processed in a similar manner to determine the correct end point. The last three points in the second series are processed in a similar manner to determine the correct point at the finish of the stroke. If the second series of signals consists of only two points further processing is not performed since each one of the two points is an end point of the stroke.

According to the present invention, a multi-scale recognizer measures distance between the first and last points in a stroke, and the lengths of each line segment to recognize the stroke.

DISCLOSURE OF THE INVENTION

A "multi-scale" recognizer matches two strokes having the same number of line segments. The "multi-scale" recognizer, stores many examples, each drawn at a different time by the user and each one of those examples is represented by several filterings at different scales. The "multi-scale" recognizer measures distance only between the first and last points in the stroke, and the directions and lengths of each line segment.

BRIEF DESCRIPTION OF THE DRAWINGS

FIG. 5 is a diagram illustrating different stroke lengths;

FIG. 6 is a diagram illustrating distorted strokes;

FIG. 20 illustrates how the scale of a stroke is stored;

FIG. 21 illustrates orientation and reflection for a stroke; and

BEST MODE OF CARRYING OUT THE INVENTION

Symbols hand-drawn with an electronic pen or with a mouse can be read and recognized by computer. These symbols often consist of several strokes, lines from pen-down to pen-up. These strokes are usually recognized as symbols in a low-level alphabet, and then combined in an attempt to obtain some higher-level symbol. Sometimes, the stroke itself is the symbol. The initial stroke recognition is the subject of this invention.

This stroke recognition is not for natural languages, but for artificial languages, such as geometric shapes like the rectangle and the circle, and other symbols used in proofreading, mathematics, music, etc. However, it may be applied to a natural language system.

Figure 1A:
FIG. 1 is composed of FIGS. 1A, 1B, 1C, 1D. and 1E which illustrate successive angle filtering steps.
Figure 1B:
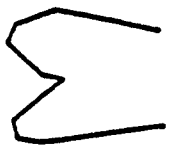
Figure 1C:

It is assumed that input filtering on the stroke has already reduced the large number of input points from the device (FIG. 1A) to a small number of features (FIG. 1B). This initial filtering breaks the input stroke into line segments like traditional nex sampling. Then an angle filter keeps angle changes larger than some threshold (FIG. 1C). The stroke consists of a series of head-to-tail vectors between input points. The change of direction between successive vectors forms an angle.

The angle threshold can be small, medium, or large, which keeps direction changes that are small, medium, and large (FIGS. 1C,D,E). These are like small-, medium-, and large-scale features, known to the field of shape recognition. Regions of high curvature are known to be features that are good to extract, and an angle filter finds most of its points in these regions. The angle threshold sets the size of the high-curvature region detected Angle filters are traditional. Multi-scale processing of stroke data has been done before too, as described in the referenced U.S. Pat. No. 4,718,103 and Japanese Patent 57-159385. The novel construction of this invention is that it combines angle filtering with the concept of multiple scales.

A recognizer must be able to generalize if it is to be trained with few examples. Large-scale feature extraction is a traditional way of generalizing, but it is accident-prone when fine distinctions are necessary. Small-scale feature extraction is a traditional way to memorize fine distinctions, but similarly-shaped objects that differ in detail are impossible to recognize with only small-scale data. Multi-scale recognition is popular, because it both generalizes and memorizes. It trains quickly, needing further training only to distinguish similarly-shaped but different objects.

Different settings of an angle filter do not really correspond to different scales. Treating them as if they do is useful, but it requires a storage organization and an algorithm different from the usual multi-scale treatment.

Figure 2:
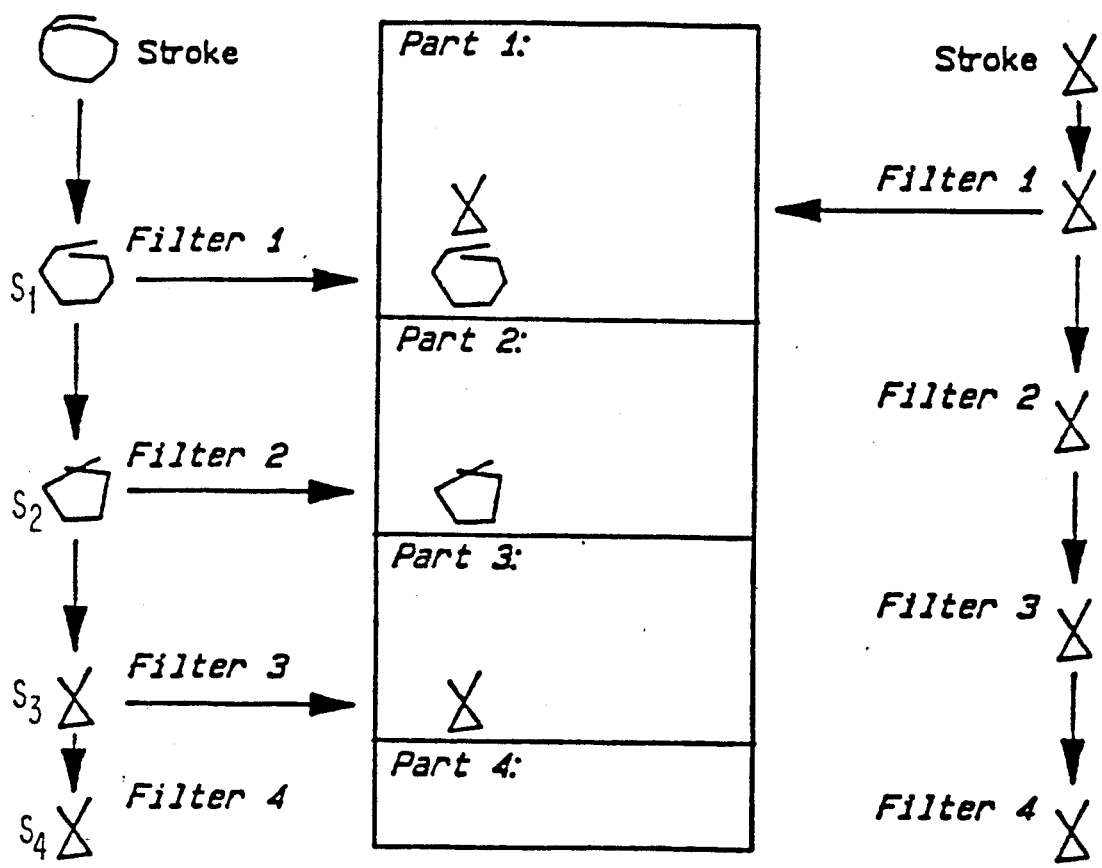
FIGS. 2, 3 and 4 are tables illustrating how to recognize different strokes.

FIG. 2 shows a table being trained to recognize a curvy stroke (a circle) and a three-line angular stroke shaped like a tepee. The angle filter's output at different direction-change thresholds, in a sense, extract features at different scales. These become prototype strokes, which are stored in different parts of the table.

The small-scale prototypes give precise, reliable, recognition, when they match an unknown, but they contain so many details that a successful match to an unknown is unlikely. The large-scale prototypes are more likely to match, because there is less detail, but they are error-prone.

Filter 1 eliminates direction changes less than 27-degrees. Filters 2-4 look for coarser distinctions, eliminating angles less than 38-degrees, 54-degrees, and 75-degrees respectively. These values give the best recognition rate against a collection of test strokes.

Length is a criterion too, but that is covered later. The directions and lengths, shown graphically in FIG. 2, are coded numerically. Directions are quantized to the hours of a 12-hour clock. Two scalars per type of stroke code rotations and reflections.

Only four of the eight prototypes produced by the filtering in FIG. 2 are put in the table; four are not. The problem is that the circle prototype stored in part 3 of the table looks just like the tepee input stroke. The two are separated in the table so that they will not be confused with each other when it comes time to recognize unknown strokes. The training procedure does this by putting, in the table only prototypes that differ from earlier-filtered versions of the same stroke. For example, the tepee stroke is unchanged by filtered removal of small-scale features, because it has no small-scale features. The versions unchanged by later filtering are not stored. Omitting duplicate prototypes from the table speeds recognition. Speed is further enhanced by training misrecognized strokes only to the scale at which misrecognition occurred.

The different parts of the table represent different distances, in some abstract information-measuring space, from an original input stroke to a simplified representation that may be easier to recognize. Without exception, the top of the table corresponds to a small distance, and the bottom to a large distance, provided that the table is trained with the procedure shown in FIG. 2 that refuses to load duplicate prototypes. How the table in FIG. 2 is trained, is described later with respect to the flowchart of FIG. 11.

Figure 3:
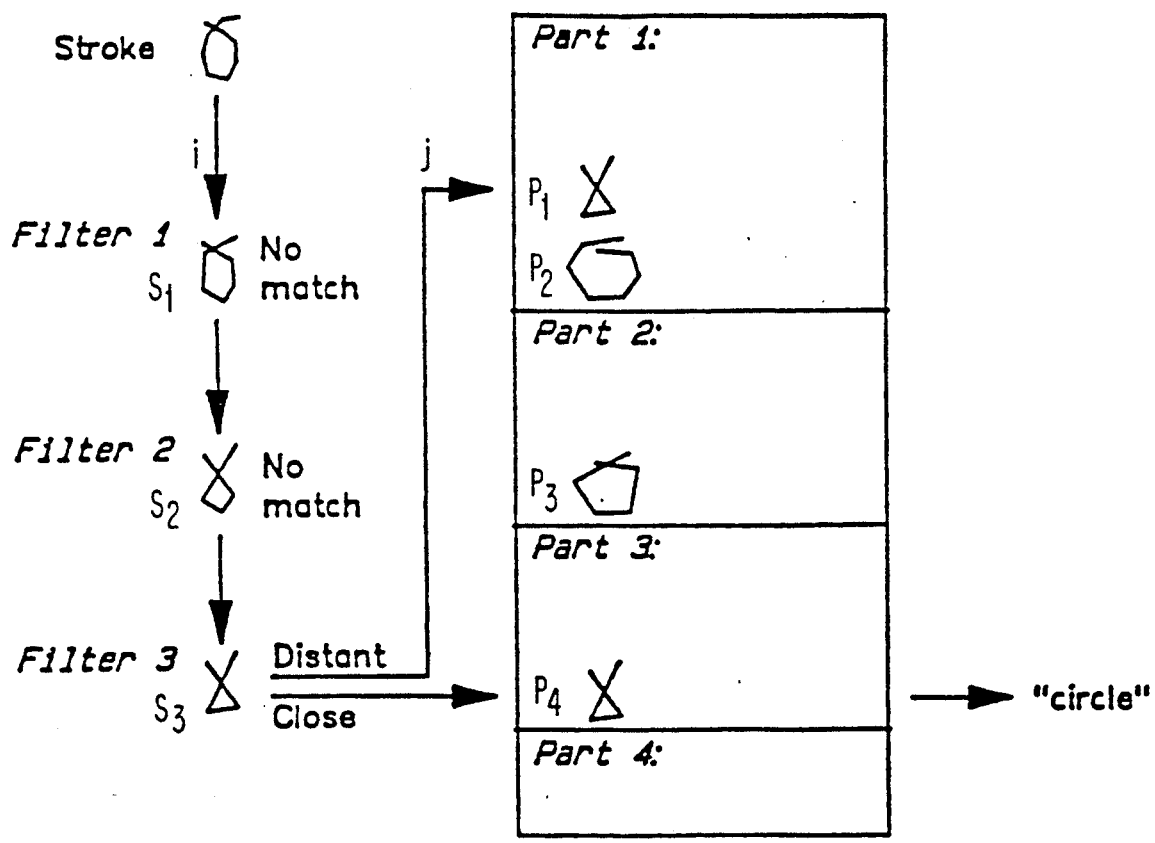

Now that the table is trained, it is time to explore how it recognizes. FIG. 3 shows an unknown input stroke recognized as a circle. Of course, the same angle filters are used as during training, so that the unknown stroke will filter to something as close as possible to the prototypes. The output of each filtering step is compared to all likely prototypes in the table. With each step, details are discarded until the matching algorithm succeeds.

The unknown circle is recognized on the third filtering, because then the unknown and the circle prototype have the same number of line segments with about the same direction and length. The unknown also matches the tepee in part 1 of the table, but the algorithm prefers a match between an unknown that took three filterings to a stored prototype that also took three filtering to look similar, because there is more of a chance that they started out looking similar before filtering.

By contrast, an input tepee stroke is probably recognized after one filtering of the unknown, preferring a match to the tepee prototype in part 1 of the table to the circle in part 3. How the table in FIG. 4 recognizes is described later with respect to FIG. 17.

Figure 4:
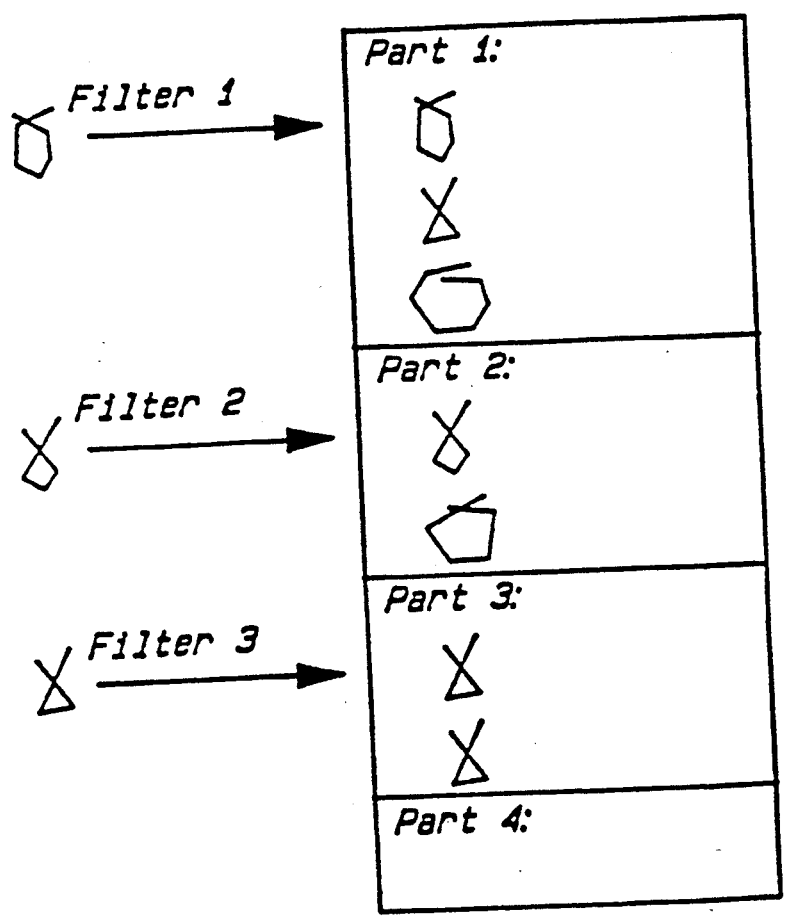

Suppose, however, that the user intended the hand-drawn stroke in FIG. 3 to be a proof-reader delete mark. FIG. 4 shows the table being trained to recognize this new stroke. In part 3 of the table, the new delete stroke is identical to the old circle. How can the table decide between them in the future? The choice must be made on the basis of smaller-scale features, say in part 2 of the table. That can become reliable, after a few more misrecognitions between the circle and the delete are trained in to the table. This is because, when the prototypes in part 3 are indistinguishable and therefore accident-prone, the corresponding prototypes in part 2 are nearly the same, and so give good coverage for correct recognition in part 2. With only a few more prototypes in part 2, coverage will be complete.

Because this situation can occur between any two adjacent parts of the table, the table can be thought of as automatically adapting to distinguish between any two symbols, regardless of how similar they are, within the limits of quantization error inherent in this approach.

To keep the algorithm description simple, the length of the line segments that make up a stroke has been ignored so far. Length is a weighted factor in recognition, but does not fundamentally affect the algorithm design.

There are three issues having to do with length: distinguishing between otherwise similar strokes, deciding when a stroke is too distorted, and eliminating short line segments as small-scale features.

Sometimes length is the only way to distinguish between symbols, for example, a down pointer and a check mark (FIG. 5).

Figure 7A:
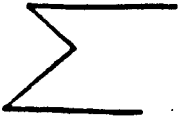
FIG. 7 is a diagram illustrating how lengths of lines are matched.
Figure 7B:
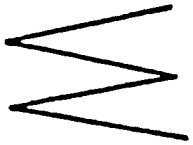
Figure 7C:

At other times, a stroke may be so length-distorted that it is not reasonable to recognize it at all. However, large length distortions seem to be acceptable (FIG. 6). A useful cutoff for recognition seems to be to prevent a line segment that is much longer than others in the input stroke from matching a line segment that is much shorter than others in the prototype, and vice versa (FIG. 7). Lengths are therefore coded short, medium, or long.

Figure 1D:
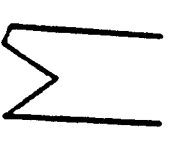
Figure 1E:
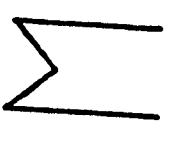

Short line segments look like small features and should be eliminated too, along with small direction changes. Performance against test data verifies this. Returning to FIG. 1, FIG. 1D shows a short line segment eliminated in FIG. 1E purely because of its length.

Filter 1 (27-degree direction change) eliminates line segments smaller than 1/10 the size of the stroke's maximum x or y dimension. For filter 4 (75-degree direction change), a good figure is 1/5. Length and direction-change are thus both features extracted at various scales.

The algorithm of the invention seeks the traditional good performance of recognition based on multiple scales using the output of the traditional angle filter, which is only a little like scale information.

The relation of the output of an angle filter to the customary use of the term scale depends as much on the input to the filter as on the filter threshold. Scale corresponds to the frequency of a notch filter, with small scale equaling high frequency. An angle filter is a notch filter that becomes, instead, a low-pass filter in direct proportion to the variation in stroke curvature.

Returning to FIG. 2, for a hand-drawn circle curvature is constant, so an angle filter is a notch filter. The angle filter finds, at small direction changes, many short, small-scale line segments around the edge. At a large direction-change threshold it manufactures new, long lines connected with large direction changes, which are large scale features. For a circle there is no difference between this algorithm, and traditional recognition based on scale.

For angular strokes like the teepee (FIG. 2), which has a high change of direction per unit length (0 to 120 degrees) and consists of only large-scale features, the angle filter finds, at a small direction change threshold, the large-scale features. This is a low-pass filter.

Returning to FIG. 3, for a stroke consisting of a curvy line whose curvature varies, for example the distorted circle, the angle filter finds, at a small direction change threshold, a mix of long lines and large direction changes along with short lines with small direction changes in proportion to the variation in curvature. With successive filtering at larger direction changes, new long lines with big direction changes are manufactured and short small-direction-change lines are combined in inverse proportion to the original variation in curvature.

As has just been seen, it is only to a rough approximation that one can think of this algorithm's table as having a small-scale end and a large-scale end. But that approximation is a useful one to make discussion simple.

Tradition has it that the fastest multi-scale search direction is from large scale to small scale, because this is thought to avoid searching the many small-scale features. The algorithm of this invention searches the other way, from small scale to large scale, without appearing to be slower. It avoids searching most small-scale features, because it aborts early (step 4 below) when it becomes clear that there is no hope of a match.

Large-scale to small-scale searching has the efficiency of testing fewer and fewer prototypes at progressively smaller scales. However, small-scale to large-scale searching can do a similar thing during training by omitting redundant large-scale prototypes from the table (FIG. 2).

Searching from small scale to large scale also gains efficiency by not searching many scales; the search is longest for curvy strokes, but instrumentation shows that even curvy strokes are matched on the order of 60% of the time at scale 1 (S1), and 80% of the time by scale 2 (S2). A match indicates success with no need to search large scales.

Both schemes, when well implemented, ought to have similar speeds.

The recognition algorithm previously shown graphically in FIG. 3A is set forth in pseudo code below. The recognition algorithm is shown later in flow chart form in FIG. 17. The program that implements this algorithm uses weighting factors, some of which completely dominate others. It is cast in terms of program logic below to make it easier to read.

1. Read the input data points and reduce them to a manageable number by some fast algorithm.

2. Set $i=1$. This sets the scale of the angle filter applied to the input.

3. Extract features from unknown stroke at scale i. (Scale 1:27-degrees, 1/10. Scale 2:38-degrees, 1/9. Scale 3:54-degrees, 1/7. Scale 4:75-degrees, 1/5.)

4. Compare unknown stroke at scale i with all stored prototype strokes. To match, the unknown must have the same number of line segments as the prototype, the directions of the line segments must be the same to within plus or minus one, and short lines in the unknown cannot be long lines in the prototype or vice-versa. Abort each comparison on the first mismatch beyond these thresholds.

5. If no matches and $i<4$, then set $i=i+1$ and go to step 3.

6. If no matches and $i<=4$, then declare failure and quit.

7. Have at least one match. If only one match, then declare success and quit.

8. There is more than one match somewhere in the table. Prefer matches to scale i, if no match there, try scale $i-1, i+1, i-2, i+2$, etc. If there is just one match at the first scale to have any matches, then declare success and quit.

9. There is more than one match within the selected part of the table. Prefer that the lengths of the line segments are more nearly the same. Unless there is a tie, declare success and quit.

10. There is still more than one match. Prefer that the angles match more closely. Unless there is a tie, declare success and quit.

11. There is still more than one match. Prefer the more recently-defined prototype (coded by position in the table), declare success and quit.

Angular-gesture training is quick. A gesture made up of straight lines is completely trained in 2 to 5 repetitions as previously seen in FIGS. 1 and 5.

Figures 8, 9:
FIG. 8 is a diagram of a G-clef stroke.
FIG. 9 which is comprised of FIGS. 9A and 9B, illustrate a curving and a straight line, respectively.

Training curvy-gestures, for example a g-clef (FIG. 8), takes longer, because of the inherent mismatch between its curvy nature and the algorithm's line-segment quantization. A g-clef can be reliably trained in 6-20 repetitions (10 average).

Figure 9A:
Figure 9B:

A gently curving, nearly straight line (FIG. 9A) can be reliably distinguished from a straight line (FIG. 9B) with about 4 repetitions of training.

An alternative to a table-driven multi-scale recognizer is to write a small hand-crafted single-scale program for each stroke one wants to recognize. Experience shows that these hand-crafted programs have a lower error rate for curvy strokes, like a circle or a proof-reader's delete mark, but a higher error rate for strokes made from straight line segments, like a rectangle or a summation sign.

For the system builder, a table-driven recognizer allows interactive training, which makes defining new strokes easy, and the table simplifies turning on and off recognition of a stroke. For the end-user, interactive training allows adaptation to user idiosyncrasies, both in minor changes to improve recognition accuracy, and in major changes if the user re-defines a stroke's shape. The algorithm produces user-independent recognition, but users are empowered to fine-tune recognition.

Quantization errors are inherent in an angle filter and in the algorithm of the invention. Angle filter quantization of a curve into line segments becomes visible to the user when the system fails to recognize a curvy stroke that looks, to the user, like a recognized stroke he trained earlier. This puzzles the user, because the recognizer, during training, accepts large variations in shape, but, seemingly at random, not small variations. An angle filter quantizes a curve into a certain number of line segments in certain directions. These variations, invisible to the user, can confuse the matching procedure. The multi-scale table covers up this problem to some extent by creating large-scale prototypes that match a wide range of input.

Fortunately, this non-intuitive training behavior disappears once enough training makes recognition reliable.

Occasionally, a newly-trained stroke, say a delete symbol, is so similar to another, different kind of stroke, say a circle, that it blocks reasonable recognition of the other stroke. An interactive command can be implemented that destroys troublesome prototypes, without forcing the entire symbol to be re-defined.

Figure 10:
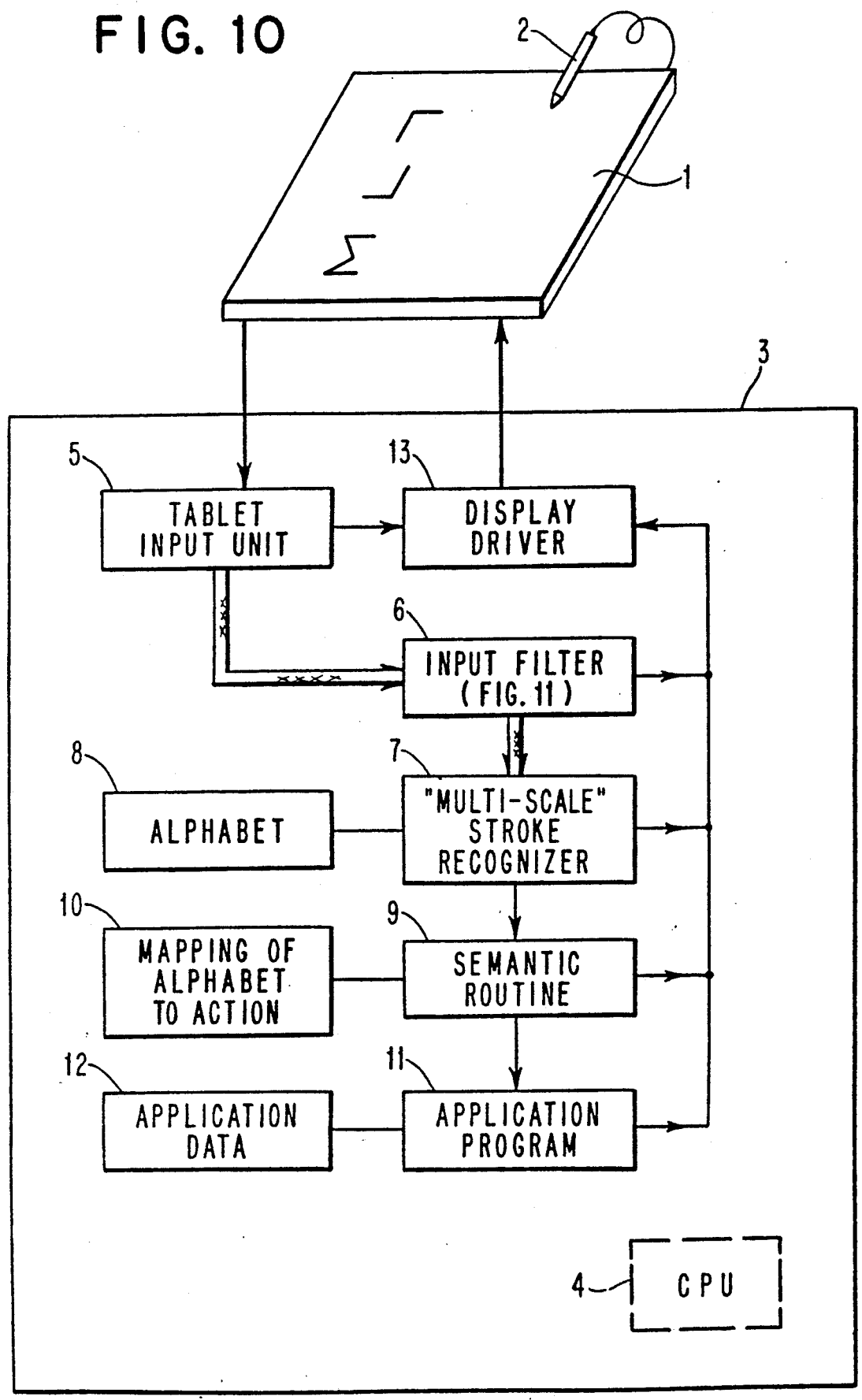
FIG. 10 is a block diagram of the stroke recognition system of the invention.

FIG. 10 shows a general block diagram of the recognition system of the present invention. A writing surface, such as a portable combination tablet/display 1 records successive positions of a writing instrument such as an electronic stylus 2. These points are sent to an attached computer system in the base of the tablet 3. A computer 4 performs the logical operations shown in the logic blocks of tablet 3, and is a microprocessor, such as an Intel 80286/386/486 base processor system, typically limited in fast computation to fixed-point operations, with a small amount of memory perhaps one megabyte to keep the whole package light-weight. The computer 4 reads the points from the tablet into an input unit shown in block 5. Normally, the input unit echoes back a display of the stroke to the tablet 1 via a display driver shown in block 13, as it is drawn. These many raw points are filtered by an input filter 6 that with little computation time, greatly reduces the number of points that need be inspected in more detail to see which are features that need to be kept for recognition. The filtered points are handed to a "multi-scale" recognizer in block 7, which discards more points and matches the remainder to the most similar stroke in its alphabet storage table shown in block 8. This "multi-scale" recognizer shown in block 7 and its alphabet storage table shown in block 8, are the subject of this invention. The identity of the input stroke is then given to a semantic routine, as shown in block 9, which looks up what action the stroke should cause, as shown in block 10, and tells the application program, as shown in block 11, what to do with its data in block 12. Any of these processes shown in blocks 6,7,9, or 11 can erase the initial stroke display echoed by the tablet input unit in block 5, via the display driver in block 13, and then display some revised version of the stroke or some semantic result of the stroke input.

Figure 11:
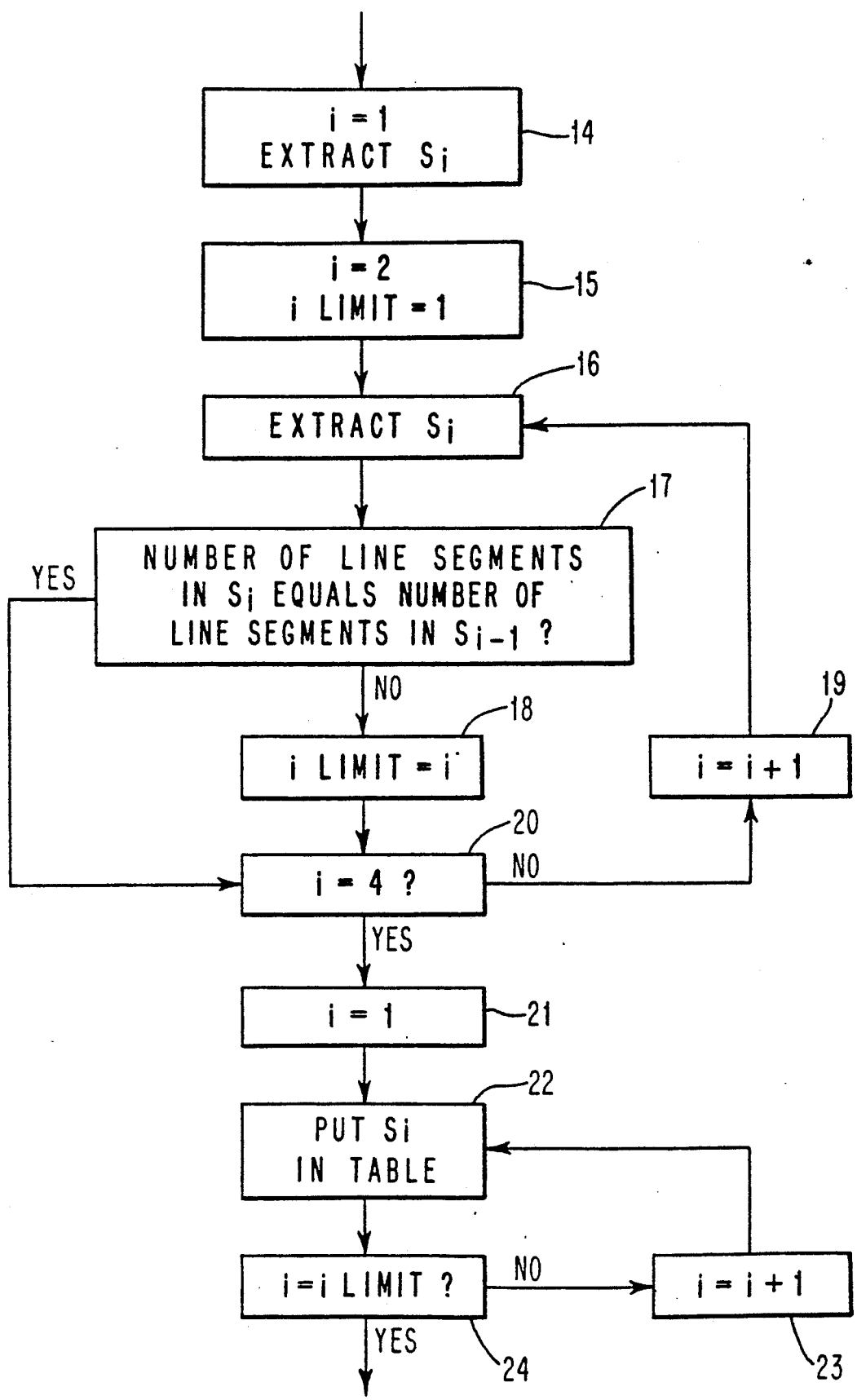
FIG. 11 is a flow chart illustrating training of new multi-scale strokes.

FIG. 11 shows a flow diagram overview of training new "multi-scale" recognizer strokes. Training is accomplished by storing different versions of the input stroke (processed at different scales) in a table. FIG. 11 is graphically interpreted by the example in FIG. 2 of training a circle. First, simplified versions (S1 through S4) of the input stroke, must be extracted from the original stroke data. This process follows the arrows down the left side of FIG. 2. The right-pointing arrows that put S1 through S3 into the table are a second step covered later. S1 is extracted first as shown in block 14 directly from the stroke input. This extraction process is shown graphically in FIG. 2 as "Filter 1", yielding S1, a version of the input stroke with fewer xy points than the original. This extraction is explained in detail in FIG. 12. S2 through S4 are extracted one each from the preceding S, so for example, S2 is extracted from the points in S1, S3 is extracted from the points in S2 and so on. FIG. 11 shows the controlling loop for this process. It starts with setting variable i to two, as shown in block 15, which will be used to extract Si, where i will be successively two through four. At the same time the limit is set to one. This controls how many of the Si's are saved in the table, which in the example in FIG. 2 ultimately is 3, so that only S1 through S3 are stored in the table. High-numbered Si's that do not differ from each other are not stored in order to prevent confusion. Si is extracted, as shown in block 16, which is initially S2 and ultimately S4. If the number of line segments in Si is not the same, as tested in block 17, as the number of line segments in Si-1, then ilimit is set to i, as shown in block 18, so that S1 through Si are eventually stored in the table. Otherwise Si may, or may not, be eventually stored. If i is not equal to 4 as checked in block 20, increment i as shown in block 19, and return to block 16 to extract other Si's. This is repeated until S4 has been extracted, i=4, and processed in block 20. Then, S1 through Silimit are stored from block 21 into the table (right-pointing arrows in FIG. 2). This is done by starting with a value of 1 for i in block 21, storing Si as shown in block 22, and then incrementing i as shown in block 23 and storing more Si's until the process has reached the limit (ilimit) as tested in block 24, which is S3 in FIG. 2. This completes the training.

Figure 12:
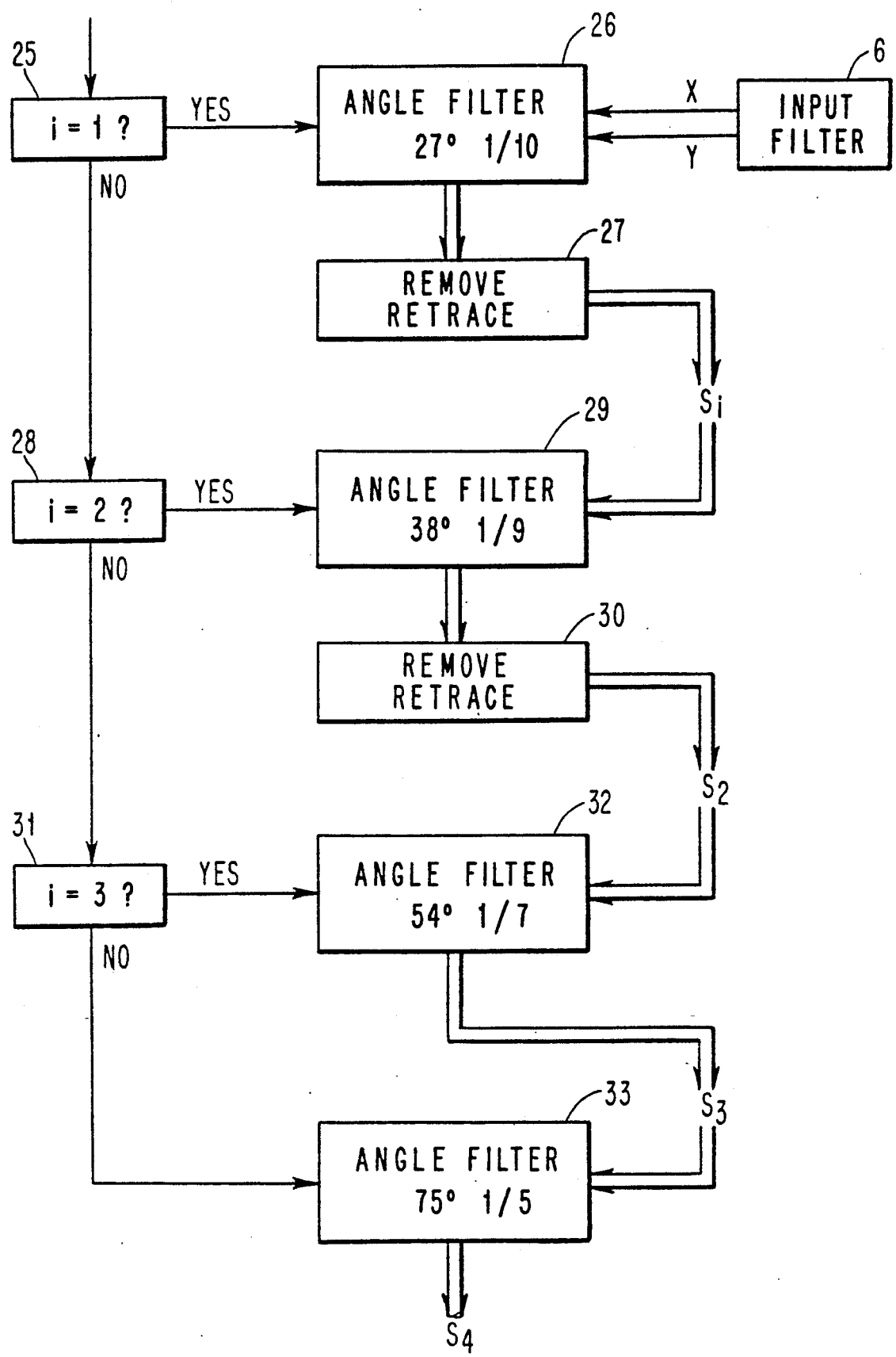
FIG. 12 is a flow chart illustrating how to extract features at a given scale.

FIG. 12 shows extracting Si (S at scale i). This is the extraction process used in FIGS. 11 and 16. The process does one of four things, depending on which of the four scales is being extracted. It could be scale 1, as tested in block 25, in which case the angle filter in block 26 receives the raw xy points from the input filter 6, shown in FIG. 10. Arrows with double tails show the flow of xy data in this FIG. The angle filter 26 removes angle changes smaller than 27-degrees, and line segments shorter than 1/10 the stroke size. Operation of the angle filter is shown in FIG. 13, and the size of the stroke is defined in FIG. 14. The resulting points are inspected in block 27 to see if they contain a redundant retrace that must be removed; this process is explained relative to FIG. 15. The result is a subset of the input filter xy points, labeled S1, and extraction is complete. If, however, S2 is being extracted as shown in block 28, a similar process occurs in the angle filter of block 29, starting with reading S1, which is assumed to exist from a previous request to extract S1. Angle changes less than 38-degrees and line segments less than 1/9 the stroke size are removed. A redundant retrace, if it exists, is removed, as shown in block 30, and the resulting S2 is produced. Likewise S3 can be extracted from input S2, as shown in block 31, with the angle filter 32 set to 54-degrees, with line segments less than 1/7 the stroke size removed, producing output S3. At large scales, checks for redundant retraces did appear to help, and are omitted. If the input is not a request for S1, S2, or S3, then it must be a request to extract S4 from S3 at 75-degrees and 1/5 stroke size, as shown in block 33, with output S4.

Figure 13A:
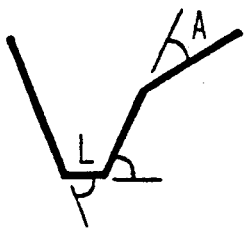
FIG. 13 is composed of FIGS. 13A and 13B which are diagrams illustrating the operation of an angle filter.
Figure 13B:
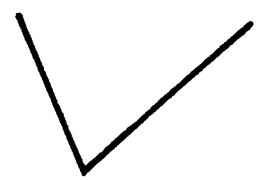

FIG. 13 graphically shows the operation of the angle filter used in FIG. 12. An example input, as shown in FIG. 13A, consists of four line segments, two of which must be removed. Segment "L" is too short, shorter than some given fraction of the stroke size. Line segment "A" lies in a direction that differs from its neighbor by some small change in angle, smaller than the threshold. One of the endpoints of line segment "L" is removed, and so is the endpoint of "A" that makes the small direction change, producing the output shown in FIG. 13B.

Figure 14:
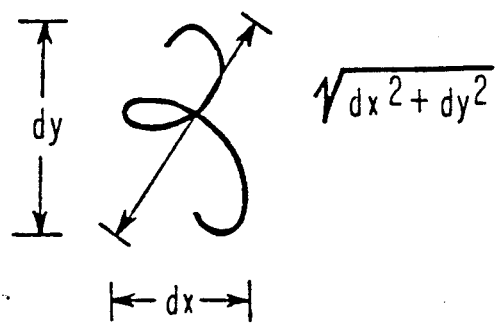
FIG. 14 is a diagram illustrating the size of a given stroke.

FIG. 14 shows what is meant by the size of a stroke. This is used by the angle filter in FIG. 12, and it determines length codes in FIG. 17. The x and y size (dx and dy) are in tablet units, about 0.1 mm. The x and y dimensions of the stroke (dx and dy) are found by subtracting the minimum form the maximum x and y values. This forms a box, whose diagonal length $\sqrt{dx^2+dy^2}$ is the size of the stroke, which is used in FIG. 17 to categorize line segments as short, medium, or long.

Figure 15A:
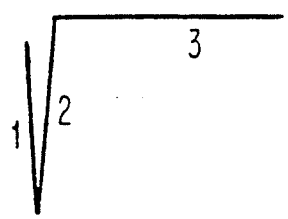
FIG. 15 is composed of FIGS. 15A, 15B and 15C which illustrate successive steps of removing a redundant retrace in a stroke.
Figure 15B:
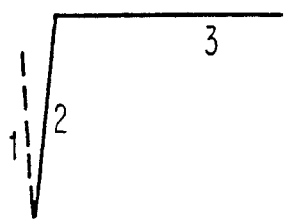
Figure 15C:
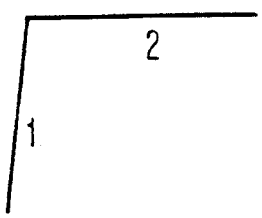
Figure 16:
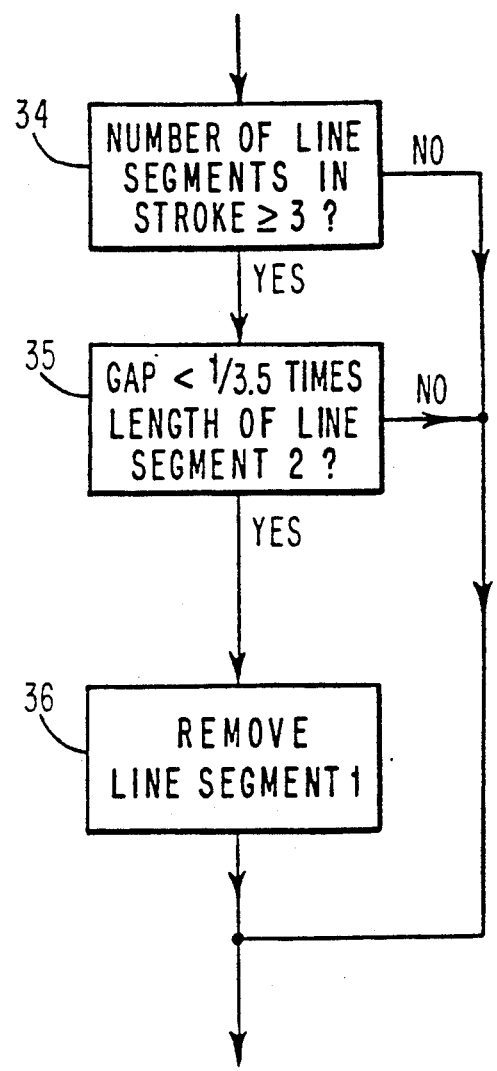
FIG. 16 is a flow chart illustrating how the redundant retrace of the stroke in FIGS. 15A, 15B and 15C is removed.

FIG. 15 illustrates successive steps in removing a redundant retrace. Only a single retrace, as shown in FIG. 15, at the beginning of a stroke is removed with each application of this retrace-remover. FIG. 16 is a detailed flow chart of an individual retrace-remover such as the retrace-removers shown generally in blocks 27 and 30 of FIG. 12. A sharply-pointing caret symbol, which consists of only two line segments with a small gap between the beginning and the end is for purposes of description a legal stroke, even though it resembles a line with a retrace. It has to be made sure that the stroke has at least three line segments as determined in block 34 of FIG. 16 before looking for a redundant retrace. In this example, the user has drawn an upper-left corner bracket with one side retraced. If the gap shown in FIG. 15A, between the beginning of the stroke and the far end of line segment 2 is less than 1/3.5 the length of line segment 2, as calculated in block 35 of FIG. 16, then line segment 1 is declared to be a redundant retrace of line segment 2, and segment 1 is removed as shown in FIG. 15B. This is accomplished at block 36 of FIG. 16. This produces an output with one less line segment than the input, as shown in FIG. 15C.

Figure 17:
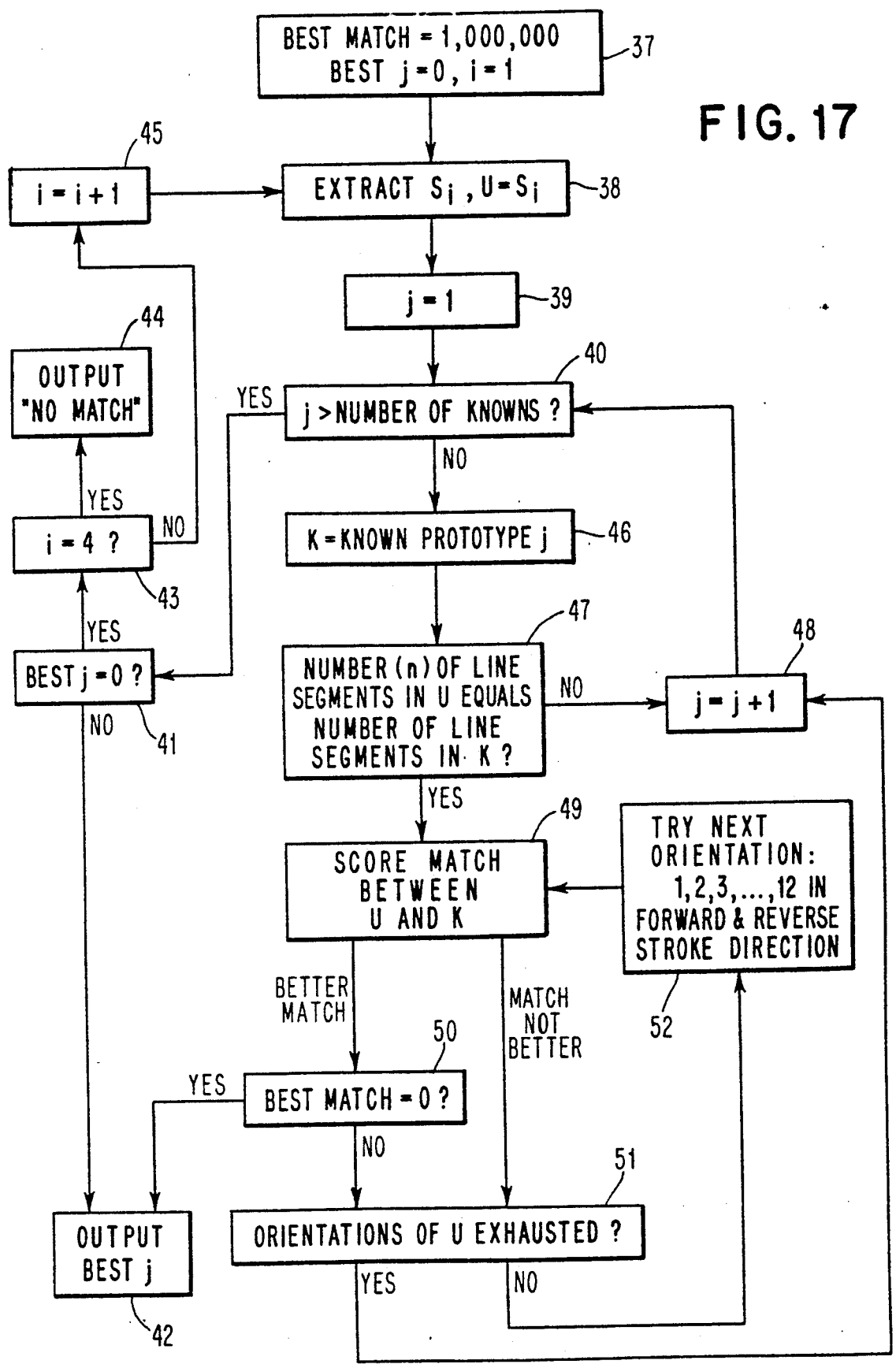
FIG. 17 is a flow chart illustrating the overview of multi-scale recognition.

FIG. 17 shows an overview of "multi-scale" recognition. A graphic example of this recognition is also shown in FIG. 3. Recognition occurs when at the best match between one of the multi-scale versions of the unknown input stroke, and one of the multi-scale known prototypes. The best match is scored by "bestmatch", as shown in block 37, which starts at 1,000,000 (a terrible match, worse than there ever really could be). A perfect match is zero. A pointer to the know prototype that best matches the unknown (u) is set initially to zero, and non-existent prototype number signifying that no acceptable match has yet occurred. Counter i is set to 1 in block 37; this is the scale of the unknown successively 1 through 4 for S1 through S3, shown in FIG. 3. Si (initially S1) is extracted from the input stroke and renamed U, the unknown, for notational convenience, as shown in block 38. There are other subscripts appearing soon, so this is a chance to eliminate one that rarely changes, and need not be of concern. Variable j is set to 1 as shown in block 39. This points to each of all of the known (k) prototype (P1 through P4 in FIG. 3) in turn to compare them to U. If j, as shown in block 40 has run off the end of this table of knowns, then one Si has been compared to all knowns. A non-zero bestj as determined at block 41 indicates that some match has been found between Si and some Pi, so a pointer (bestj) is output, as shown at block 42, to this Pi. For the example in FIG. 3, no matches occur until S3, which matches two prototypes.

Pointer bestj, now non-zero, as shown in block 41, indicates the better of these, it is output at block 42, and the process stops early without extracting an S4 or matching it against the known prototypes. The process ends early like this as a kind of weighting factor that always prefers a match to the smallest-scale Si that matches anything, because larger-scale objects are more abstracted and generalized, which makes matching them error-prone. A zero bestj as calculated at block 41 indicates that no acceptable match was found. Unknowns with larger scales are tried until a match is found and output at block 42 or until the largest scale unknown has been checked in block 43. If 8-4 in block 43, the largest scale unknown has been checked and is unrecognized, and a "no match" is output at block 44. If i is not equal to 4, i is incremented in block 45 and the process repeats in blocks 38, 29 and 40 as previously explained.

Returning to where j was inspected in block 40 to see if it had run off the end of the table, assume that it has not, so there are more knowns to match against the unknown. Select the jth known prototype in block 46, marked Pj in FIG. 3, and call it K for "known". Like U, this K is only a notational convenience to eliminate a slowly-changing subscript that would otherwise clutter the remaining text. If the unknown has a different number of line segments than the known, as calculated in block 47, the two are too different to be compared, and the j pointer is advanced in block 48 to the next known, and a return is made to block 40 and then to block 46. If the number of line segments "n" are equal in block 47, a score is calculated in block 49 that shows how well they match. If there is a better match between U and this K than to other K's inspected previously, a test is made in block 50 to see if the match is perfect. If so, then, since nothing is better than perfect, the process can stop early, and a pointer (bestj) is output in block 42 for this K, and the process stops. If the match is not perfect as calculated in block 50, or if U is not a better match to this K than to some other K as calculated in block 49, proceed to block 51 to test if the orientation is exhausted. If there are still other orientations of K to try, proceed to block 52 and try another orientation, and return to block 49. If the orientations are exhausted, move on to the next known prototype in block 48.

One of these orientations of K is the line segments of K in the reverse order that they were drawn. This finds a match between U and a K that looks the same, regardless of which way the pen moved when U was drawn. Some known's can be matched after rotation or reflection. These constitute more orientations of K to consider. For example, when a square is trained, the user can draw it once with the stroke starting and ending in, say the upper left corner. The user then indicates that this known should be recognized in any of 4 orientations differing by 90-degrees. K is rotated in block 52 successively by 90-degrees in an attempt to match to U. A close match can then be made to an unknown square drawn with the beginning and ending points in its lower right corner. Likewise, the user can ask that the process attempt recognition of both left-handed and right-handed versions of the known, and the process will pass the known's points through a vertical reflection plane at this point in the recognition. If so, K is tried in block 52 both for reflected and unreflected for each 90-degree turn. Instructions for these symmetry operations are stored with each known prototype, as FIG. 18 shows.

Figure 18A:
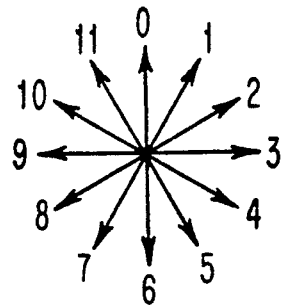
FIG. 18 is comprised of FIGS. 18A, 18B and 18C which illustrate direction codes of a sample stroke.
Figure 18B:
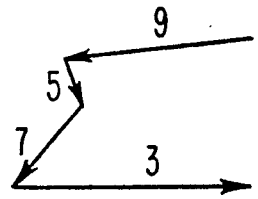

FIGS. 18A-18C show direction codes and FIGS. 19A-19D show length codes of a sample stroke. In the case of a known prototype, rotation and reflection information as shown in FIG. 21 is also stored as just discussed. In the "square" example above, orientations are coded as 4 with equal rotation increments through 360 degrees are assumed, and "reflection" is coded as "yes". For the example of the summation sign in FIGS. 18B, 19A and 19C, however, orientation is coded as 1 in block 53 of FIG. 21, since only one orientation makes sense for a summation sign, else it could be an "M" or a "W". The summation sign's reflection is coded "no", in block 53 of FIG. 21, since a reflection through the vertical axis would produce a meaningless backwards sigma. Other information is stored for all strokes, both known prototypes and unknown input strokes. This "stroke" on display, is one of S1 through S4, or one of the Pj known prototypes. As such, each has a scale at which it was extracted, shown as scale=1 (coded "s=1") in this summation-sign example in block 54 of FIG. 20. For known prototypes, the scale equals the number of the "Part" of the table in FIG. 3 in which the prototype occurs. That is, all prototypes in "Part 1" for the table were extracted at scale 1 (S1) when they were trained into the table.

This example summation sign consists of four line segments as shown in FIG. 18C in directions 9,5,7, and 3. These are direction codes, corresponding to the number on a 12-hour clock (FIG. 18A) in directions 9:00, 5:00, 7:00, and 3:00 respectively, and are named d1, d2, d3, and d4. These names are subscripts in FIG. 22.

Figure 19A:
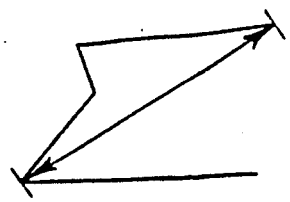
FIG. 19 is comprised of FIGS. 19A, 19B, 19C and 19D which illustrate length codes for a sample stroke.
Figure 19B:
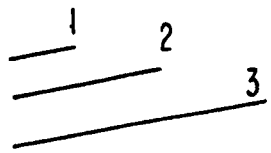
Figure 19C:
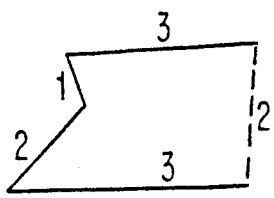

The length of each of these line segments is coded 1 for "short," 2 for "medium," and 3 for "long," compared with the diagonal size of the stroke in FIGS. 14 and 19A. "Medium" length lines are between $\frac{1}{3}$ and $\frac{2}{3}$ the length of the diagonal size of the stroke, and short and long lines are shorter or longer than this. In this summation-sign example, the line segment lengths shown in FIG. 19D are 3,1,2, and 3. These are named 11,12,13, and 14 respectively, and these are also subscripts in FIG. 22. The final length is the gap between the beginning and the end of the stroke. This is called "g" and is of length 2 (medium) in this example, and "g" is a subscript in FIG. 19D.

Figure 22:
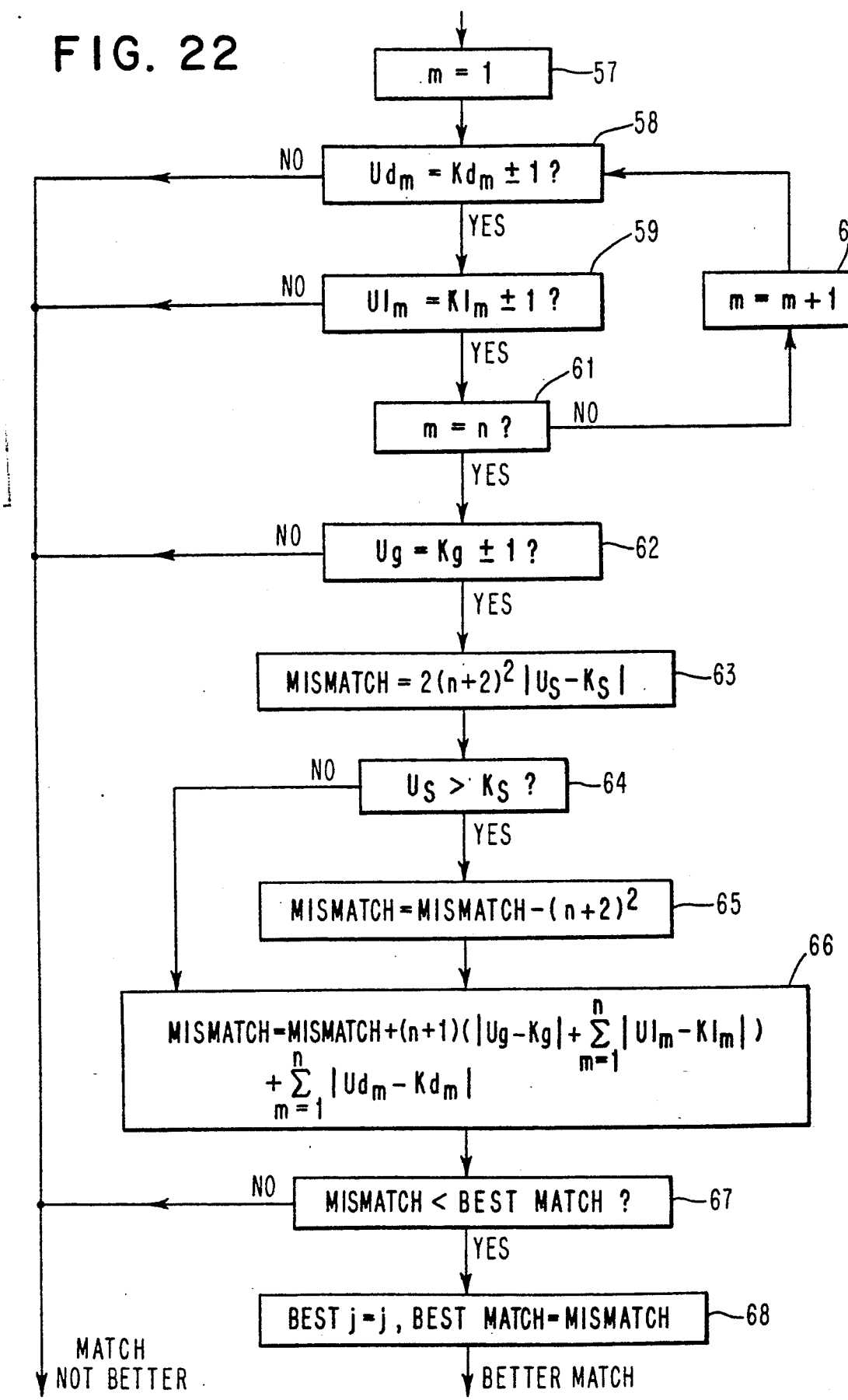
FIG. 22 is a flow chart illustrating how to score how close an unknown stroke matches each known stroke.

FIG. 22 shows scoring how closely the unknown stroke matches each known. This expands on the process in FIG. 17 of scoring a match between U and K in block 49. U is the unknown stroke extracted at some scale, and K is a known prototype, also at some scale, stored in the table. FIGS. 18 and 19 show the meanings of subscripts of U and K that signify properties of these strokes. The direction of the line segments in U are Ud1, Ud2, Ud3, etc. The length of the line segments in U are Ul1, Ul2, Ul3, etc. the length of the gap between the beginning of a stroke U and the end is Ug. The scale at which U was extracted is Us. In FIG. 17, the number of line segments (n) in U and K is established to be equal.

Returning to FIG. 22, and starting with the first of these line segments in block 57, their directions in block 58 and lengths in block 59 are compared. If the directions of corresponding line segments in U and K differ by more than one hour of a 12-hour clock in block 58, or if the corresponding lengths in block 59 differ by more than 1 (a long compared to a short), then reject K as a match for U (follow the "not better match" arrow) in block 61. Compare each corresponding line segment in block 60 in turn, until all line segments in block 61 have checked out OK. Just as with the line-segment length check, also check the gap in block 62 (ug and Kg) between the beginning and the end of the U and K strokes to be sure that one is not short and the other long. If there is that much of a mismatch, then reject K as a match for U (follow the "not better match" arrow). Otherwise, calculate the degree of mismatch in block 63 between U and K. The smaller this number, the better the match. This is a multi-step process, beginning in block 63 with the heaviest weight (the greatest penalty) given to differing scales of U and K. FIG. 3 shows an example of this penalty. In the case of S3 (U) matching P1 (K), the scale of S3 (Us) is 3, since it is the result of the "Filter 3" step, and the scale of P1 (Ks) is 1, since it is in "Part 1" of the table, having been trained there after a "Filter 1" step. Us-Ks=3-1=2, which is then multiplied by twice the square of the number of line segments plus two in U. This gives scale mismatch a higher weight than all other mismatches combined, and the number of line segments in U is the same as the number in K. When FIG. 3 compares S3 to P4, Us=3, and Ks=3, since P4(K) is in "Part 3" of the table. Us-Ks=3-3=0, and so there is no penalty, since both have the same scale. Since this factor is the most heavily weighted, P4 is preferred over P1, no matter what other mismatches in line segment direction or length exist.

Returning to FIG. 22, if Us is greater than Ks as calculated in block 64, then some of the scale-mismatch penalty is subtracted in block 65, so that all other things being equal, U prefers to match to a K one scale smaller than to a K one scale larger. This is because large-scale prototypes are more abstract, more generalized, a process that is accident-prone, since essential features may be abstracted away or distorted into other features. The next heaviest weighted term used to calculate the mismatch between U and K is performed in block 66 and is a mismatch in the gap between the beginning and end of the stroke (Ug-Kg), combined with mismatch between the length of any of the line segments in U with its corresponding line segments in K (Ulm-Klm). These mismatches are weighted by the number of line segments in the stroke plus 1, just enough to be a heavy weight, but not enough to overpower a mismatch in scale. The most lightly-weighted term is a mismatch in the direction of the line segments in U with their corresponding line segment inK (Udm-Kdm). This term is weighted by a factor of only 1, so that these mismatches cannot overpower a mismatch in length. The total mismatch between U and K has been computed. Is it less (better) than the best match found so far, as calculated in block 67? If not, then change nothing (follow the "not better match" arrow), but if so, proceed to block 68, and save "j", the pointer to this K that matches U so well, and also save the amount of mismatch. Later, it can be determined if a better match is found.

I claim:
1. A handwritten character recognition apparatus comprising:
means for sampling a known handwritten character;
n filters, where n is an integer $\geq 2$, with the first such filter filtering out direction changes less than a first angle in said known handwritten character to pro- vide a first filtered known character, with the second such filter filtering out direction changes less than a second angle in said first filtered known character, where said second angle is greater than said first angle for providing a second filtered known character and so on, with the nth filter filtering out direction changes less than an nth angle in the (nth−1) filtered known character, where the nth angle is greater than the (nth−1) angle, to provide an nth filtered known character; and storing the n filtered known characters for subsequent comparison to an unknown handwritten character.

2. The combination claimed in claim 1, including means in each of said n filters for removing lines in a filtered character that are shorter than a given length.

3. The combination claimed in claim 2, including means for removing any retrace from at least said first filtered known character.

4. The combination claimed in claim 1, including:
means for sampling an unknown handwritten character;
m filters, where m is an integer ≧2, with the first such filter filtering out direction changes less than a first angle in said unknown handwritten character to provide a first filtered unknown character, with the second such filter filtering out direction changes less than a second angle in said first filtered unknown character, where said second angle is less than said first angle, for providing a second filtered unknown character and so on, with the mth filter filtering out direction changes less than an mth angle in the (mth−1) filtered unknown character, when the mth angle is greater than the (mth−1) angle, to provide an mth filtered unknown character;
comparison means for comparing said first filtered unknown character with said n filtered known characters, for comparing said second filtered unknown character with said n filtered known characters and so on, and for comparing said mth filtered unknown character with said n filtered known characters; and
means for recognizing said unknown character as said known character if any comparison matches within predetermined limits.

5. The combination claimed in claim 4, wherein each of said m filters includes means for removing lines in a filtered unknown character that are shorter than a given length.

6. The combination claimed in the claim 5, including means for removing any retrace from at least said first filtered unknown character.

7. A handwritten character recognition apparatus, comprising:
means for sampling a known handwritten character:
a first means for filtering out direction changes less than a first angle in said sampled known handwritten character to provide a first filtered known character;
at least a second means for filtering out direction changes less than a second angle, where said second angle is larger than said first angle, in said first filtered known character to provide a second filtered known character;
means for storing said first filtered known character and said second filtered known character;
means for sampling an unknown handwritten character;
a third means for filtering out direction changes less than said first angle in said sampled unknown handwritten character to provide a first filtered unknown character;
at least a fourth means for filtering out direction changes less than said second angle in said first filtered unknown character to provide a second filtered unknown character;
a first comparison means for comparing said first filtered unknown character with said stored n filtered known characters;
a second comparison means for comparing said second filtered unknown character with said stored n filtered known characters; and
means for recognizing said unknown character as said known character if either comparison by said first or second comparison means matches within predetermined limits.

8. A handwritten character recognition apparatus, comprising:
means for sampling a known handwritten character:
a first means for filtering out direction changes and less than a first angle and lines less than a first length in said sampled known handwritten character to provide a first filtered known character;
means for removing any retrace in said first filtered known character;
at least a second means for filtering out direction changes less than a second angle, where said second angle is larger than said first angle, and lines less than a second length, in said first filtered known character with any retrace removed to provide a second known character;
means for removing any retrace in said second filtered known character;
means for storing said first filtered known character and said second filtered known character with any retrace removed;
means for sampling an unknown handwritten character;
a third means for filtering out direction changes less than said first angle and lines less than a first length in said sampled unknown handwritten character to provide a first filtered unknown character;
means for removing any retrace in said first filtered unknown character;
at least a fourth means for filtering out direction changes less than said second angle and lines less than said second length in said first filtered unknown character to provided a second filtered unknown character;
means for removing any retrace in said second filtered unknown character;
a first comparison means for comparing said first filtered unknown character with retrace removed with said stored n filtered known characters with retrace removed;
a second comparison means for comparing said second filtered unknown character with retrace removed with said stored n filtered known characters with retrace removed; and
means for recognizing said unknown character as said known character if either comparison by said first or second comparison means matches within predetermined limits.

9. A method of recognizing hand drawn strokes made up of a plurality of line segments connecting xy points, said method comprising the steps of:

sampling a known hand drawn stroke;

filtering out all adjacent line segments in said known hand drawn stroke that form an angle less than a first angle at their common xy point, and replacing said adjacent line segments with a line segment between their uncommon xy points, to form a first filtered known stroke;

filtering out all adjacent line segments in said first filtered known stroke that form an angle less than a second angle at their common xy point, and replacing said adjacent line segments with a line segment between their uncommon xy points to form a second filtered known stroke; and storing said first filtered known stroke and said second filtered known stroke for subsequent comparison to an unknown hand drawn stroke.

10. The method of claim 9, including the steps of:

removing any line segments in said first and second filtered known strokes that are less than a predetermined length.

11. The method of claim 10, including the step of:

removing any retrace in said first and second filtered known strokes.

12. The method of claim 9, including the steps of:

sampling an unknown hand drawn stroke;

filtering out all adjacent line segments in said unknown hand drawn stroke that forms an angle less than a first angle at their common xy point, and replacing said adjacent line segments with a line segment between their uncommon xy points, to form a first filtered unknown stroke;

filtering out all adjacent line segments in said first filtered unknown stroke that form an angle less than a second angle at their common xy point, and replacing said adjacent line segments with a line segment between their uncommon xy points to form a second unknown stroke;

comparing said first filtered unknown stroke with said n filtered known strokes;

comparing said second filtered unknown stroke with said n filtered known strokes; and recognizing said unknown hand drawn stroke as said known hand drawn stroke if either comparison is within predetermined limits.

13. The method of claim 12, including the step of:

removing any line segments in said first and second filtered unknown strokes that are less than a predetermined length.

14. The method of claim 13, including the step of:

removing any retrace in said first and second filtered unknown strokes.

* * * * *